US012764425B2

(12) United States Patent
Barnes et al.

(10) Patent No.: US 12,764,425 B2
(45) Date of Patent: Oct. 13, 2026

(54) SYSTEM AND METHODS FOR PREDICTING AND REMOVING INTERFERENCE PATTERNS WHEN CAPTURING IMAGES FROM BEHIND A PARTIALLY TRANSPARENT DISPLAY

(71) Applicant: Veeo Technology, Inc., San Diego, CA (US)

(72) Inventors: Timothy Barnes, San Diego, CA (US); Matthew Wehner, San Diego, CA (US)

(73) Assignee: VEEO TECHNOLOGY, INC, San Diego, CA (US)

( * ) Notice: Subject to any disclaimer, the term of this patent is extended or adjusted under 35 U.S.C. 154(b) by 0 days.

(21) Appl. No.: 18/942,002

(22) Filed: Nov. 8, 2024

(65) Prior Publication Data

US 2026/0136109 A1 May 14, 2026

(51) Int. Cl.

| | |
|---|---|
| ***H04N 23/81*** | (2023.01) |
| ***G06V 10/82*** | (2022.01) |
| ***G06V 10/98*** | (2022.01) |
| ***G09G 3/20*** | (2006.01) |
| ***G09G 3/3208*** | (2016.01) |

(52) U.S. Cl.

CPC ............. *H04N 23/81* (2023.01); *G06V 10/82* (2022.01); *G06V 10/98* (2022.01); *G09G 3/2092* (2013.01); *G06V 2201/02* (2022.01); *G09G 3/3208* (2013.01); *G09G 2320/0233* (2013.01); *G09G 2320/0626* (2013.01); *G09G 2340/0407* (2013.01); *G09G 2354/00* (2013.01)

(58) Field of Classification Search

CPC ........ H04N 23/81; G06V 10/82; G06V 10/98; G06V 2201/02; G09G 3/2092; G09G 3/3208; G09G 2320/0233; G09G 2320/0626; G09G 2340/0407; G09G 2354/00

See application file for complete search history.

(56) References Cited

U.S. PATENT DOCUMENTS

| | | | | |
|---|---|---|---|---|
| 2011/0298953 A1* | 12/2011 | Nakamura | H04N 13/366 | 348/241 |
| 2014/0146127 A1* | 5/2014 | He | H04N 7/144 | 348/14.08 |
| 2014/0267835 A1* | 9/2014 | Samadani | H04N 7/144 | 348/241 |
| 2015/0049165 A1* | 2/2015 | Choi | H04N 7/144 | 348/14.16 |
| 2021/0152735 A1* | 5/2021 | Zhou | H04N 23/64 | |
| 2022/0368835 A1* | 11/2022 | Shen | H04N 23/54 | |
| 2024/0406580 A1* | 12/2024 | Oreifej | H04N 23/695 | |

* cited by examiner

*Primary Examiner* — Michael Lee

(74) *Attorney, Agent, or Firm* — Gary L. Eastman, Esq.; Eastman IP

(57) ABSTRACT

A camera located behind a partially transparent display allows for a participant in a video conference to appear to be looking directly at other participants, creating a natural eye-to-eye setting similar to an in-person meeting. However, the camera picks up moiré patterns and other distortion from the display. A machine learning model is trained to predict the interference from a frame of video on the display. The predicted interference is then subtracted from a corresponding video frame from the camera, resulting in a clean image. The clean image is then used in place of the camera's video frame in output video, resulting in high quality video useful for a video conference.

11 Claims, 9 Drawing Sheets

SYSTEM AND METHODS FOR PREDICTING AND REMOVING INTERFERENCE PATTERNS WHEN CAPTURING IMAGES FROM BEHIND A PARTIALLY TRANSPARENT DISPLAY

FIELD OF THE INVENTION

The present invention pertains generally to a system and method for removing distortion from images. The present invention is particularly, but not exclusively, useful for the removal of moiré distortion from video frames captured by a camera behind a partially transparent display.

BACKGROUND OF THE INVENTION

Today's display monitors typically have a webcam or a built-in camera on the top frame of the display area. As users typically direct their line of sight on the middle of the display, the camera only captures the user's image from the top angle which makes the user appears to be looking down. In a video conference setting, each participant tends to appear looking down instead of looking at each other eye-to-eye naturally like in an in-person meeting. The holy grail is to place the camera behind a transparent display near the center point so that camera's image captures the user as if the user is looking into the camera or looking at the other party in the eye.

However, success in placing a camera behind a display to improve videoconferencing and similar communications has been elusive. Currently available transparent display types present a variety of challenges to solving the problem.

Transparent liquid crystal display (LCD) screens are generally only around 10% transparent, which interferes with the viability of placing a camera behind the display.

Transparent organic light emitting diode (OLED) displays are currently only about 38% transparent, causing a high degree of distortion for the camera.

Transparent MicroLED displays can be up to 60% transparent, or even slightly more in some cases, but still cause at least some distortion in images captured by a camera behind the display.

Transparent projection film displays can be greater than 90% transparent—up to 92-95% transparent—but require a projector, making it a bulky solution unsuitable for compact settings. Moreover, they still present serious problems for a behind-display camera, including front-side reflection, back-side light bleeding, and moiré distortion.

Moiré patterns form a significant obstacle to obtaining a good image from a camera located behind a transparent display. They occur when the image on the display forms an interference pattern after passing through multiple apertures. The camera captures this interference on the image of the person in front of the display.

Attempts have been made to solve the interference problem with various de-moiré techniques. These techniques attempt to overcome the problem by trying to capture images from the camera while the screen is blank (black). One proposed approach is duty cycle 180-degree phase shifting; however, no practical implementation exists.

Another approach has been black frame insertion. However, complete success has been elusive, since there is no complete black frame on modern displays. Current displays use progressive scan line refresh, meaning that there is never a complete frame that is entirely black.

Black line insertion has shown some promise in overcoming the deficiency of black frame insertion by synchronizing black line insertion with the camera's progressive shuttering. However, this requires a 120 Hz refresh rate. High resolution cameras capable of opening and closing the shutter at that rate are difficult to find. Moreover, only TOLED or T-MicroLED displays can handle such a high refresh rate, but these displays currently cannot exceed 40-60% transparency. Commercial projectors that can refresh at 120 Hz are virtually nonexistent.

Transparent film with a polarizing pair of films can block light from bleeding through, which effectively eliminates moiré interference. However, this technique reduces projector brightness by 50% and greatly increases the cost of a projector. For an Ultra Short Throw (UST) projector, when used in a room with typical lighting (such as an office), the film does not reflect sufficient light to function as a monitor and serve as an alternative to conventional monitors.

In view of the above, it would be advantageous to provide a method or apparatus for eliminating interference in images captured from a camera behind a display.

SUMMARY OF THE INVENTION

Disclosed is an apparatus and method for capturing images from behind a partially transparent display, predicting interference patterns, and removing the interference patterns. The apparatus includes a display with at least 15% transparency, a camera centered behind the display, and a processor, such as a system on a chip (SoC) or other computational hardware. The processor receives an image from the video source being displayed, predicts the interference from the image, and removes the interference from an image received from the camera.

In a preferred embodiment. The processor performs the interference prediction by using a model prepared in advance with machine learning (ML). The training process for the machine learning model involves capturing a static image on the display and capturing a static image from the camera behind the display. The image from the camera is distorted with a moiré pattern and other interference. The capture of image pairs—each pair including one from the display and one from the camera—is performed repeatedly to build a large data set.

The data set is used to train an ML model; for example, a preferred embodiment uses a U-Net fully convolutional neural network (CNN). The training results in a set of "offset" or "delta" images such that when the delta image is subtracted from the image with interference, it results in a distortion-free image. The resulting model is loaded on to the processor of the display apparatus in the form of a matrix of parameters, allowing the processor to perform real time interference processing.

The real-time processing performed by the processor involves obtaining a frame of input video intended for display on the display screen, and obtaining a frame of the camera's captured video stream. In a preferred embodiment, the frame from the camera is obtained shortly after (e.g., about one frame later) than the frame from the input video. The frame from the input video is inputted into the inference model, which in turn provides a predicted delta image. The delta image is subtracted from the frame captured from the camera, resulting in a corrected image, free of moiré distortion. The corrected image is combined with digital content of a shared whiteboard, as necessary, such as a diagram, and the result is provided as output to any device that would otherwise be expecting data from the camera.

The processing of the images to output the corrected video frame is performed by the processor within 30 milliseconds in preferred embodiments, in order to provide real-time results.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
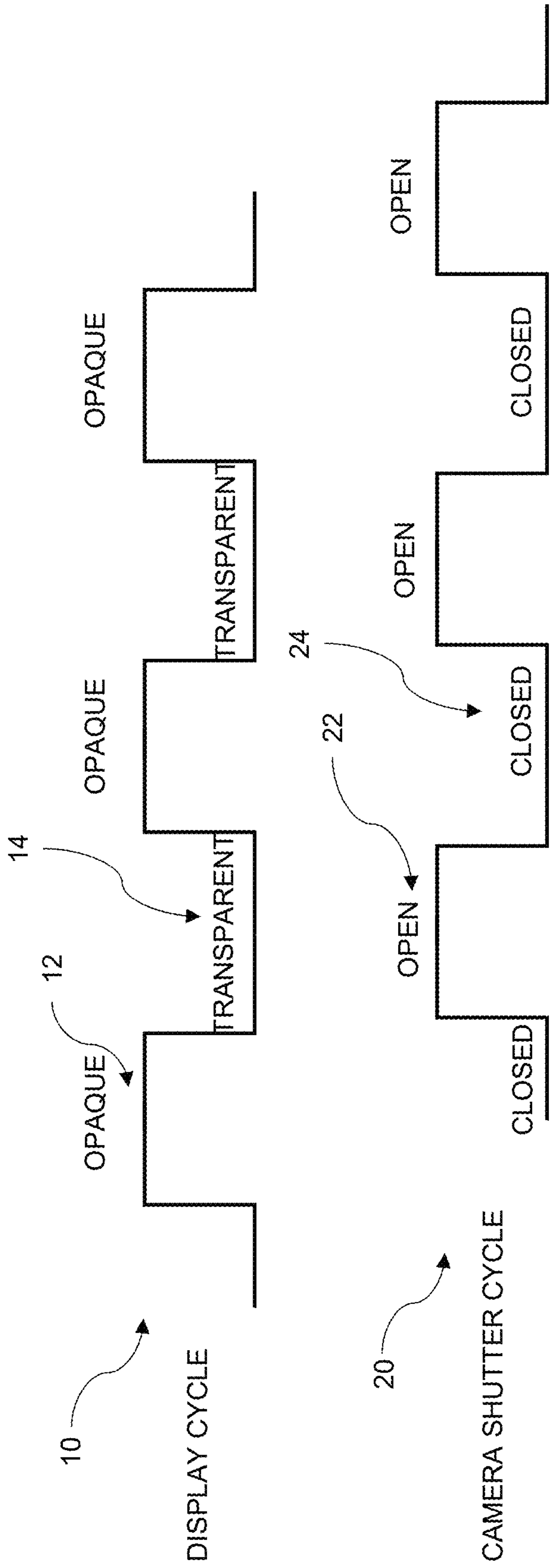
FIG. 1 (PRIOR ART)
FIG. 1 is a diagram illustrating existing attempts to eliminate interference in images from a behind-the-display camera.

Referring initially to FIG. 1, the ideal placement of a camera for a video call or video conference is behind the display, so that participants appear to be looking at each other eye-to-eye rather than looking down or in another direction. However, a camera behind a partially transparent display obtains a distorted image of the participant due to interference from the display. Prior attempts to solve the interference problem have been based on capturing a camera image while the display is blank—that is, black. This involves careful synchronization of timing between the display cycle 10 and the camera shutter cycle 20.

More particularly, the display cycle 10 involves repeated display of an image, forming an opaque portion 12 of the cycle 10, that is, a portion in which the content of the display will create interference with images captured by a camera behind the display. Between the opaque portion 12 of the cycle 10 is a transparent portion 14, in which the display is blank. This cycle 10 is repeated many times per second, based on the refresh rate. For example, a sixty hertz (60 Hz) refresh rate results in the cycle 10 alternating between opaque portion 12 and transparent portion 14 sixty times per second. Faster refresh rates, such as one-hundred forty-four hertz (144 Hz) or two-hundred forty hertz (240 Hz), in which the cycle repeats one-hundred forty four times per second or two-hundred forty times per second, respectively, are becoming increasingly popular Existing attempts to resolve distortion from display interference involve timing the camera shutter cycle 20 so that the shutter is in an open state 22 during the transparent portion 14 of the display cycle. The shutter is then in a closed state 24 throughout the opaque portion 12 of the display cycle. To accomplish this requires precise timing, and it becomes increasingly difficult with higher refresh rates. At one-hundred twenty hertz (120 Hz) or higher, it becomes difficult to make or find high resolution cameras that can open and close the shutter at the refresh rate. Moreover, even when the timing is accomplished, it fails to completely eliminate distortion: Modern displays are never fully blank while in use, so that the transparent portion 14 of the display cycle 10 is not fully transparent to the camera.

Figure 2:
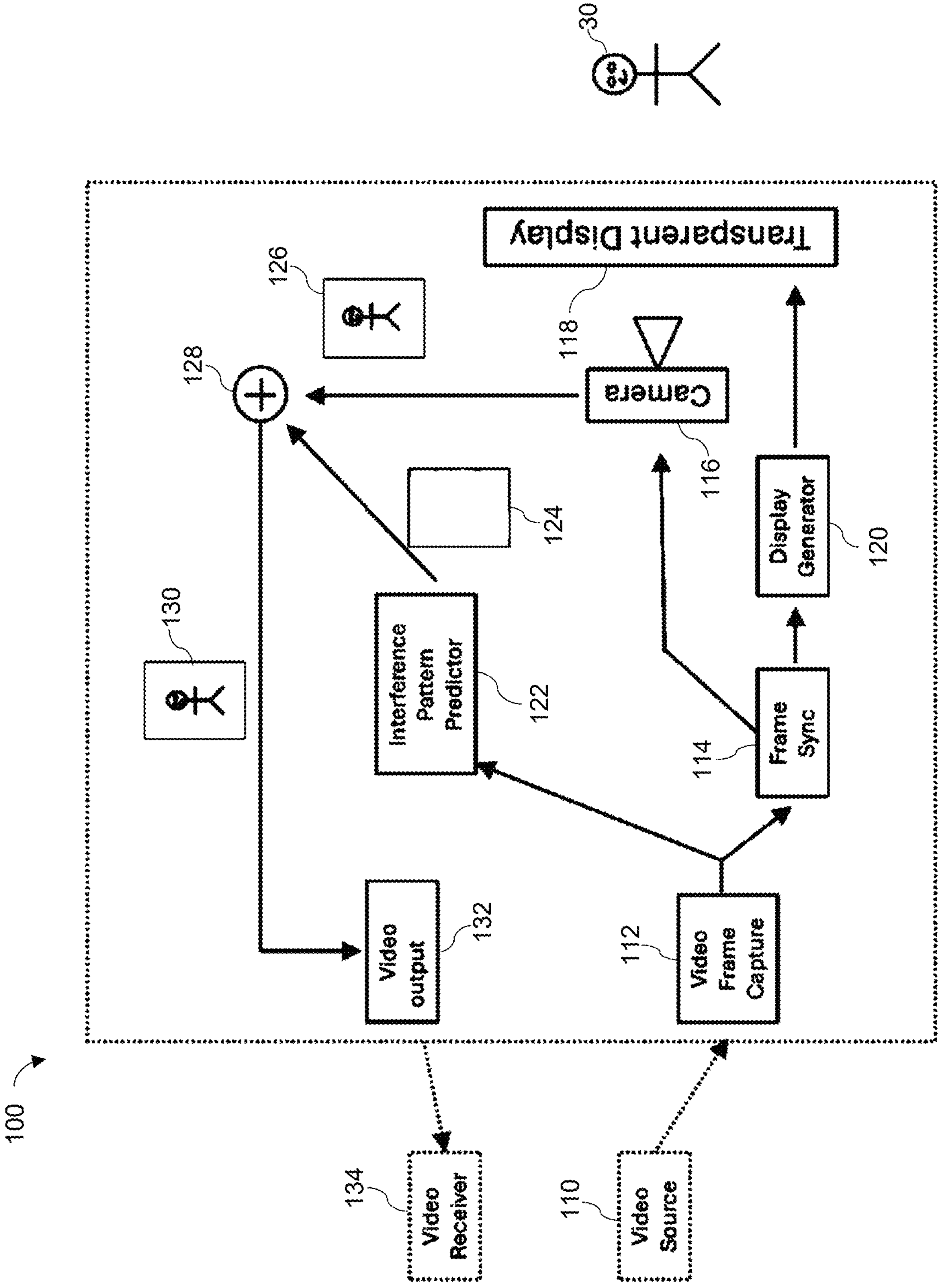
FIG. 2 is a diagram of a system for capturing images from behind a display and predicting and removing interference patterns.

Referring now to FIG. 2, a system for capturing images from behind a transparent display and predicting and removing interference patterns is illustrated and generally designated 100. System 100 receives video for display from a video source 110. A video frame capture component 112 captures frames from the video source 110 for processing. A frame sync component 114 provides synchronization between camera 116 and partially transparent display 118, allowing for matching of the content displayed on partially transparent display 118 with camera 116. Display generator 120 takes the video frame and formats it for partially transparent display 118.

Partially transparent display 118 displays the video frames from display generator 120 for a viewer 30 in front of display 118. For example, an image of another participant in a video call may be displayed. In a preferred embodiment, partially transparent display 118 is a transparent organic light-emitting diode (TOLED) display. However, other display types are suitable for use, particularly when they have at least fifteen percent (15%) transparency. Camera 116 is mounted behind partially transparent display 118, and in preferred embodiments is centered behind display 118.

Interference pattern predictor 122 receives the frame from video frame capture component 112 and predicts an interference pattern 124 using a pretrained machine learning model.

Interference pattern predictor 122 provides interference pattern 124, and camera 116 provides image 126 to correction component 128. Correction component 128 then performs a mathematical operation to remove, or "subtracts," interference pattern 124 from image 126, resulting in corrected image 130. More particularly, interference pattern 124, representing interference from the portion of partially transparent display 118 in the line-of-sight of camera 116, is upscaled to the resolution of image 126, and its negative added to image 126; this is a preferred embodiment of the "subtraction" operation referred to herein.

A sufficiently powerful processor provides the interference pattern predictor 122 using a pretrained model stored on the processor, and correction component 128 through a program stored on the processor. In some preferred embodiments, a microprocessor, such as a system-on-a-chip (SoC), is used. Also in some embodiments, the processor also forms at least part of several other components, such as video capture component 112, frame sync component 114, and display generator 120.

Corrected image 130 is provided to video output 132, which sends the video to video receiver 134, an external apparatus or system expecting video from camera 116, such as a video conference system. In this way, distortion is eliminating by removing it from the image without requiring synchronization between the shutter timing of camera 115 and the refresh rate of display 118.

Figure 3:
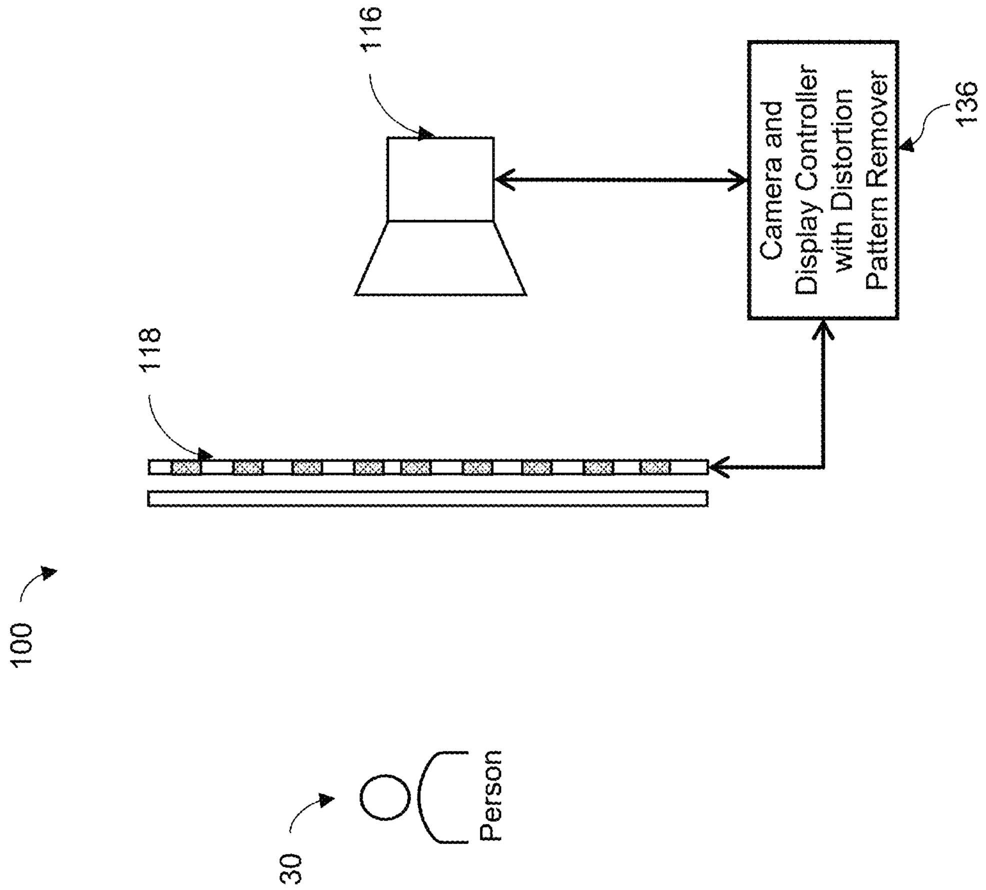
FIG. 3 is a hardware-oriented side diagram of a system for capturing images from behind a display and predicting and removing interference patterns.

Referring now to FIG. 3, a more hardware-oriented diagram of system 100 is illustrated. Camera 116 is located behind display 118 in order to obtain eye-level video of viewer 30. Controller 136 is a computing device, and in preferred embodiments is implemented in the form of the processor discussed above performs many of the conceptually distinct functions identified in FIG. 2. For example, a preferred embodiment of controller 136 operates as both a display controller and a distortion pattern remover. In order to provide real-time distortion removal fast enough to enable at least thirty frames per second of smooth video, preferred embodiments of the distortion pattern remover software executes on special purpose artificial intelligence (AI) hardware, such as a built-in AI coprocessor on the SoC. In some alternative embodiments, separate processor hardware and supporting circuitry is used for the distortion pattern remover.

Figure 4:
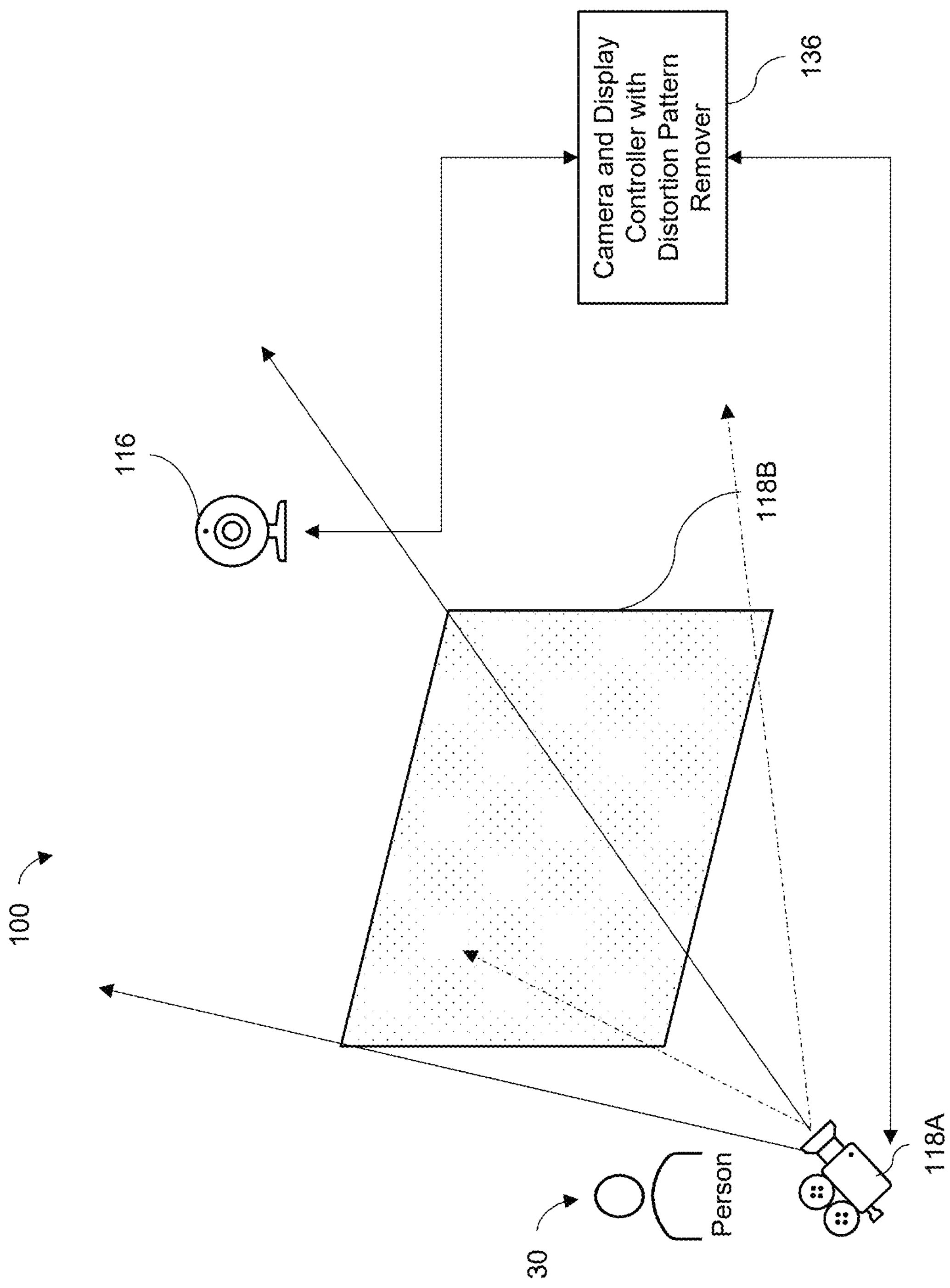
FIG. 4 is a hardware-oriented diagram of a system for capturing images from behind a display and predicting and removing interference patterns using a projection display.

Referring now to FIG. 4, an alternative preferred embodiment embodiment of system 100 is illustrated, in which the display is formed by a video projector 118A and a partially transparent projection screen 118B. Camera 116 is located behind projection screen 118B in order to obtain eye-level video of viewer 30 for more natural participation in a video call, video conference, or other use of camera 116. As with other preferred embodiments of system 100, controller 136 provides camera and display control, as well as the distortion pattern remover functionality in substantially the same manner described previously in connection with FIG. 3. A preferred embodiment uses a film with greater than ninety (90) percent transparency for projection screen 118B, and more particularly, between ninety-two (92) and ninety-five (95) transparency, inclusively. However, system 100 is able to function properly when implemented with a projection screen 118B of fifteen (15) percent transparency or greater.

Figure 5:
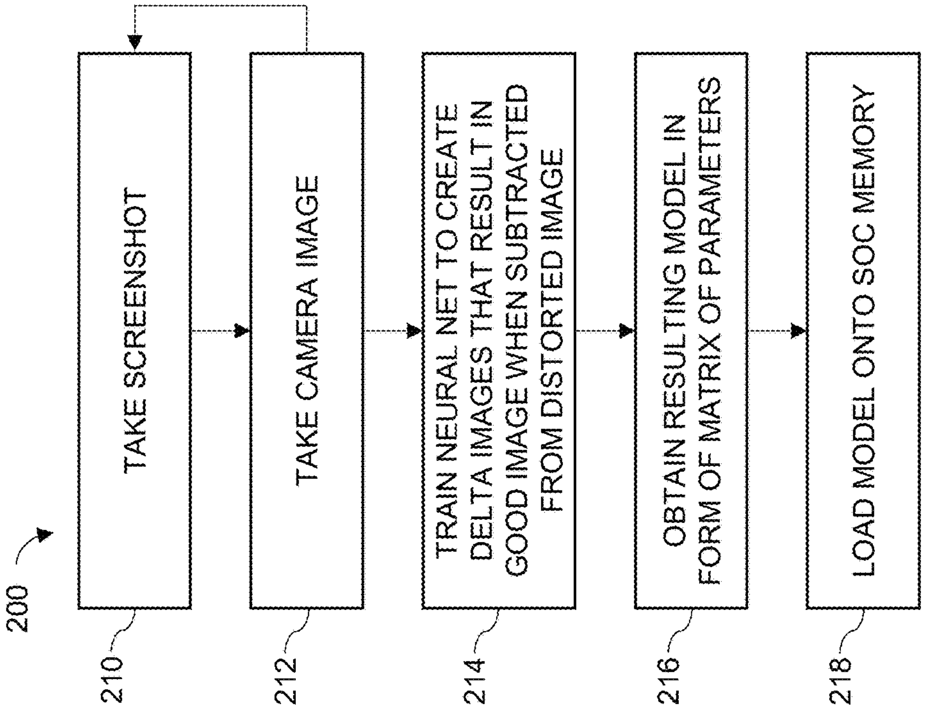
FIG. 5 is a flowchart of a training process for a neural network to create a model for predicting interference.

Referring now to FIG. 5, a process for training a neural network for interference prediction is illustrated and generally designated 200. Process 200 begins with acquisition of training data, which, in a preferred embodiment, involves step 210 of taking a screenshot of a displayed image on a display such as partially transparent display 118 (shown in FIG. 2), and step 212 of taking an image, or snapshot, from a camera behind the display, such as camera 116 (shown in FIG. 2). The snapshot is an image with distortion from the display, which usually includes, when the display is viewed from behind, a desaturated doubling of the image, a moiré pattern, and a diffuse blur over the screen. Steps 210 and 212 are repeated with distinct displayed images in order to obtain a sufficiently large dataset for training.

In step 214, the dataset containing the screenshots and snapshots is provided to a neural network in order to train the neural network to create delta images that, when subtracted from the snapshot, result in a "clean" version of the snapshot that has the distortion removed. A subregion of the display is used for the screenshot, since only a portion of the display is visible to the camera. In a preferred embodiment, the neural network is a U-Net style fully convolutional neural network. In a preferred embodiment, the model that predicts interference (the "generative model") starts with an encoder which progressively reduces spatial resolution while increasing channels. There is a high channel bottleneck for the latent representation of the model followed by a decoder that progressively reduces channels while increasing spatial resolution. This allows the model to reconstruct a similar image without relying on full-connected layers, thus allowing the model to be less computationally intensive.

In a preferred embodiment, the encoder phase of the network directly uses a pretrained architecture suitably efficient for real-time and embedded applications, such as the architecture termed "MobileNetV2." The decoder phase of the network mirrors the architecture of the MobileNetV2 decoder.

The model is trained as a generative adversarial network (GAN). More particularly, a separate model, the "discriminator" model, is used as a critic for the generative model that predicts the interference. The discriminator model attempts to distinguish between real images drawn from the test set and generated images produced by the generator model. The generator model attempts to fool the discriminator by producing images increasingly similar to the real images. The following game theory minimax game models the interaction:

$$\min_G \max_D \mathbb{E}_{x \sim P_r}[\log(D(x))] + \mathbb{E}_{x^{\sim} \sim P_g}[\log(1 - D(x^{\sim}))]$$

$P_r$ is the distribution of real images, $P_g$ is the distribution of generated images, and D(x) is the discriminator's evaluation of sample x.

A preferred embodiment of the model uses the Wasserstein distance metric for quantifying the difference between two probability distributions. This is done with the GAN variant called WGAN-GP, which also improves on training reliability by using a penalty term on gradients.

In step 216, the model resulting from training in step 214 is obtained in the form of a matrix of parameters. This matrix is loaded onto SoC memory of an apparatus such as system 100 (shown in FIG. 2) in step 218.

Figure 6:
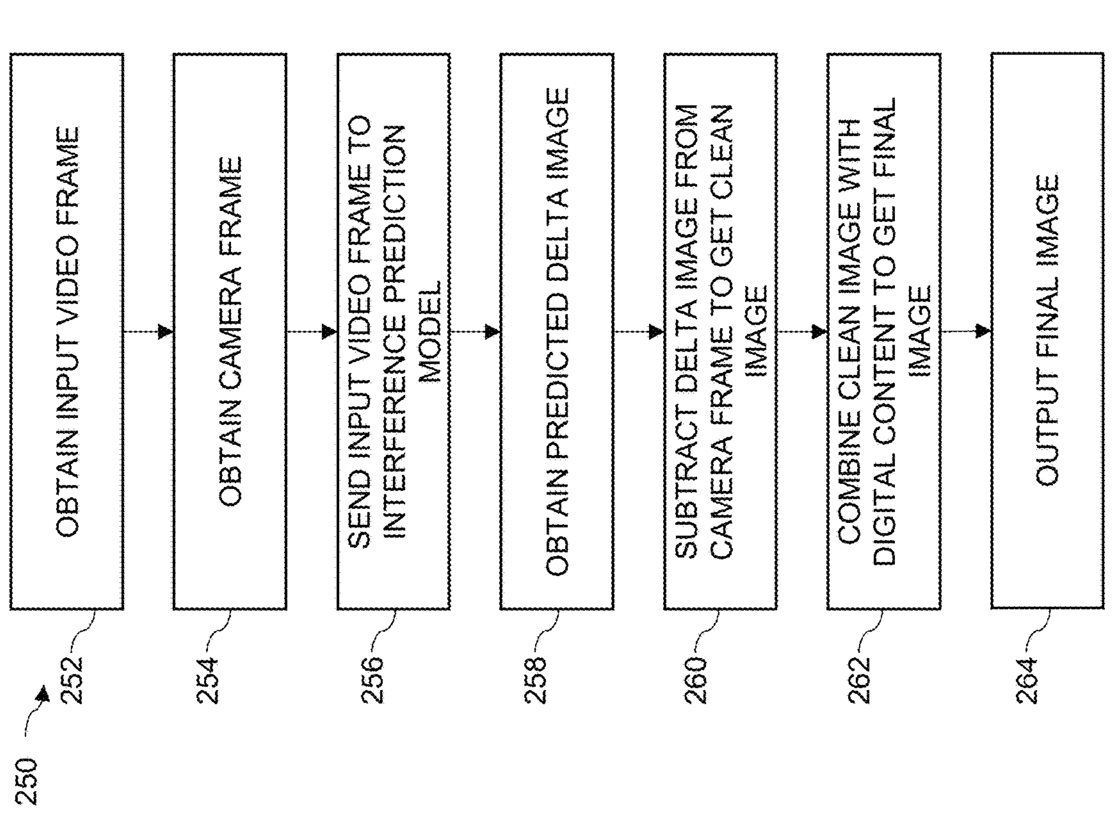
FIG. 6 is a flowchart of a process for predicting and removing interference.

Referring now to FIG. 6, a process for predicting and removing interference is illustrated and generally designated 250. Process 250 is generally performed by an apparatus such as system 100 (shown in FIG. 2) in order to remove distortion in video from a camera mounted behind a partially transparent display.

Process 250 begins with step 252 of obtaining a frame from input video, e.g., from video source 110 in system 100 (shown in FIG. 2), and step 254 of obtaining a frame from the camera. In step 256, the frame from input video is sent to the interference prediction model trained in process 200 (shown in FIG. 5). More particularly, the model receives and operates on a cropped frame that corresponds to the subset of the display that is visible to the camera. This results in acquiring a predicted delta image from the model in step 258.

In step 260, the delta image, upscaled to the size of the frame from the camera, is subtracted from the frame from the camera resulting in a clean image free of distortion. More particularly, the negative of the predicted interference is added to the frame from the camera, resulting in removal of the interference.

In step 262, the clean image is combined with digital content such as a shared whiteboard or other content, if any, in order to prepare a final image. If no digital content is to be added to or combined with the clean image, the clean image alone is used as the final image. The final image is then sent to output in step 264, which allows it to be used in a video call, video conference, live stream, or other context as desired by the user.

Figure 7:
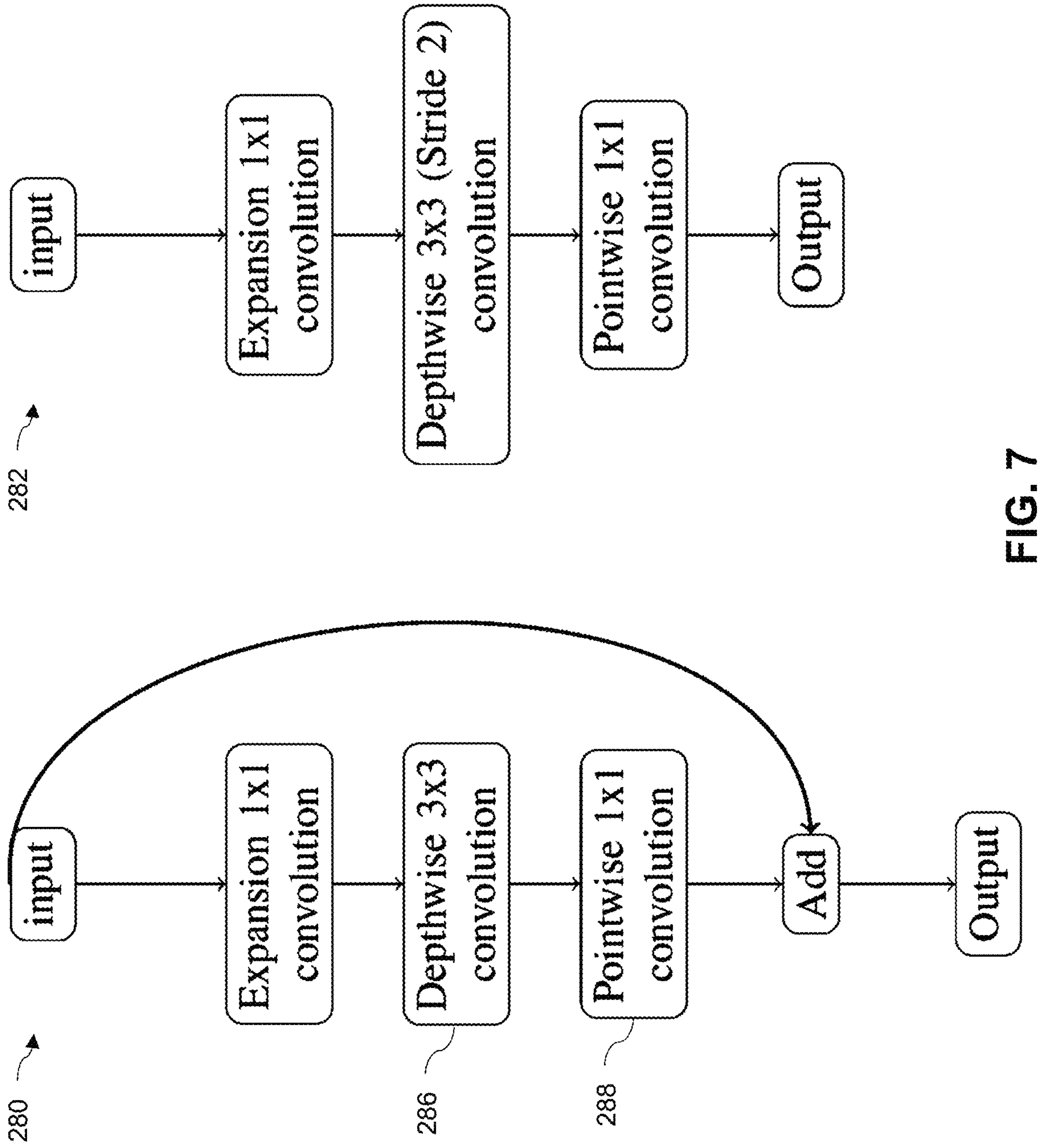
FIG. 7 is a diagram of a stride 1 block and a stride 2 block of a neural network used to predict interference.

Referring now to FIG. 7, additional detail about a preferred embodiment the model architecture, based on MobileNetV2, is illustrated. MobileNet introduced the inverted residual block 280 that decomposes a standard convolution into a sequence of a depthwise convolution 286 followed by a pointwise convolution 288. This reduces the number of parameters in the model as well as latency. MobileNetV2 is built with two block types: Inverted residual blocks 280 with "stride 1," and non-residual blocks 282 with "stride 2." The "stride 1" blocks 280 act as convolutions that do not increase the spatial resolution of the image. Convolution with a 3×3 kernel with "stride 1" results in an output image with the input's width and height while possibly increasing or decreasing the number of channels. The "stride 2" blocks 282 are used for decreasing the width and height by a factor of two. Non-linearity is added after each convolution in both blocks except after the last point-wise convolution.

The decoder phase of a preferred embodiment of the network is designed to mirror the architecture of the MobileNetV2 decoder. Each reduction in layer width and height in the decoder is paired with a nearest-neighbor upsample in the decoder followed by "stride 1" inverted residual blocks 280. Skip connections were added to make the model more effective with respect to coherency of large and small features in the output image.

Figure 8:
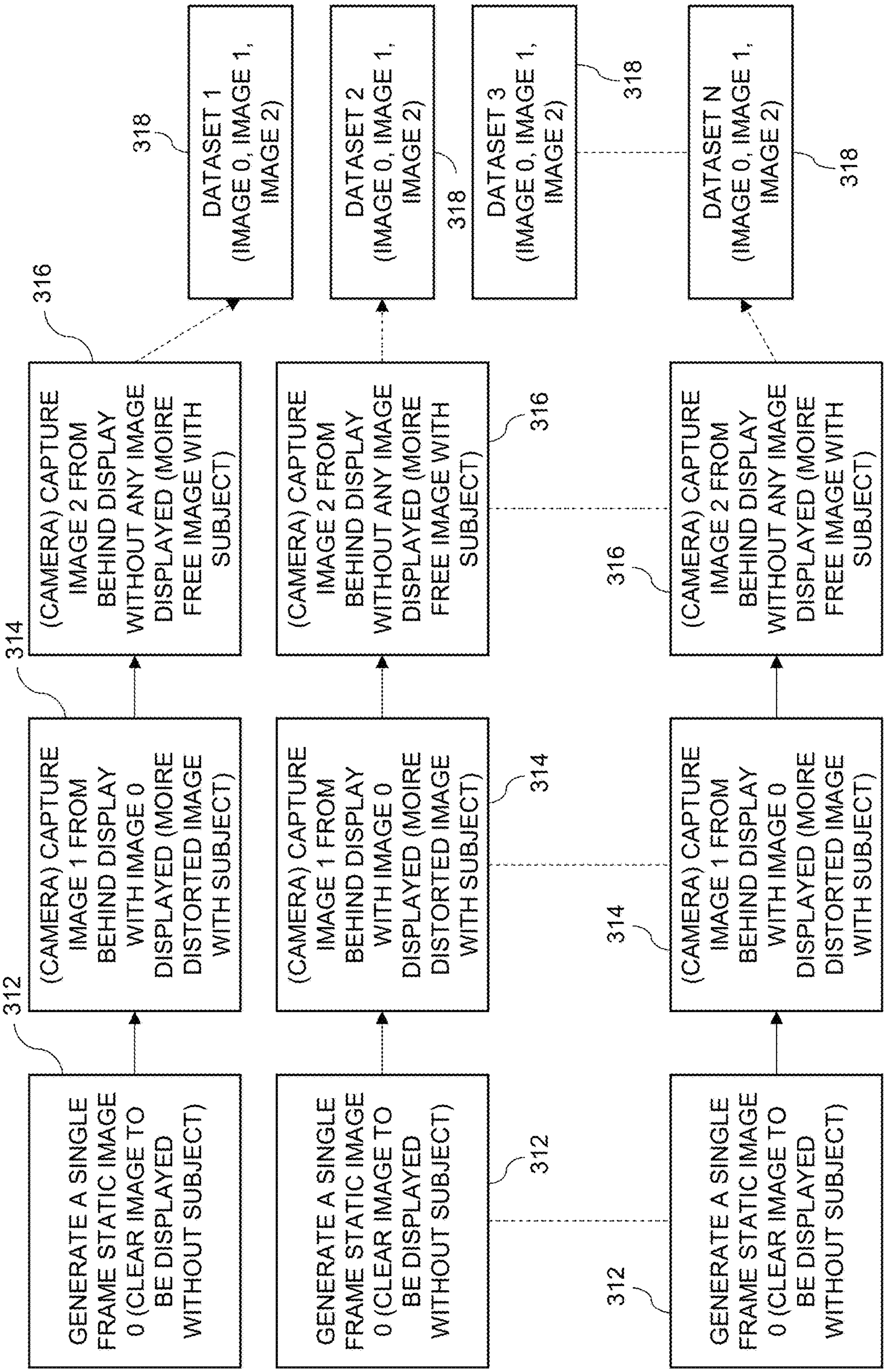
FIG. 8 is a diagram illustrating creation of a machine learning training data set for use in creating a system for predicting and removing interference.

Referring now to FIG. 8, the creation of a dataset for training a neural network for interference prediction, which was summarized briefly in steps 210 and 212 of FIG. 5, is illustrated in greater detail in FIG. 8. To create the data set, a clean image for display is generated in step 312, resulting in "image 0." Then, in step 314, "image 0" is displayed while an image is captured by a camera from behind the display, resulting in "image 1" containing a subject together with interference from the display. Finally, a clean image is captured by the camera from behind the display when no image is being displayed, resulting in "image 2" in step 316. "Image 0," "image 1," and "image 2" form a first dataset 318. Steps 312, 314, and 316 are repeated a predetermined number of times in order to provide a desired number of datasets 318 for training.

Figure 9:
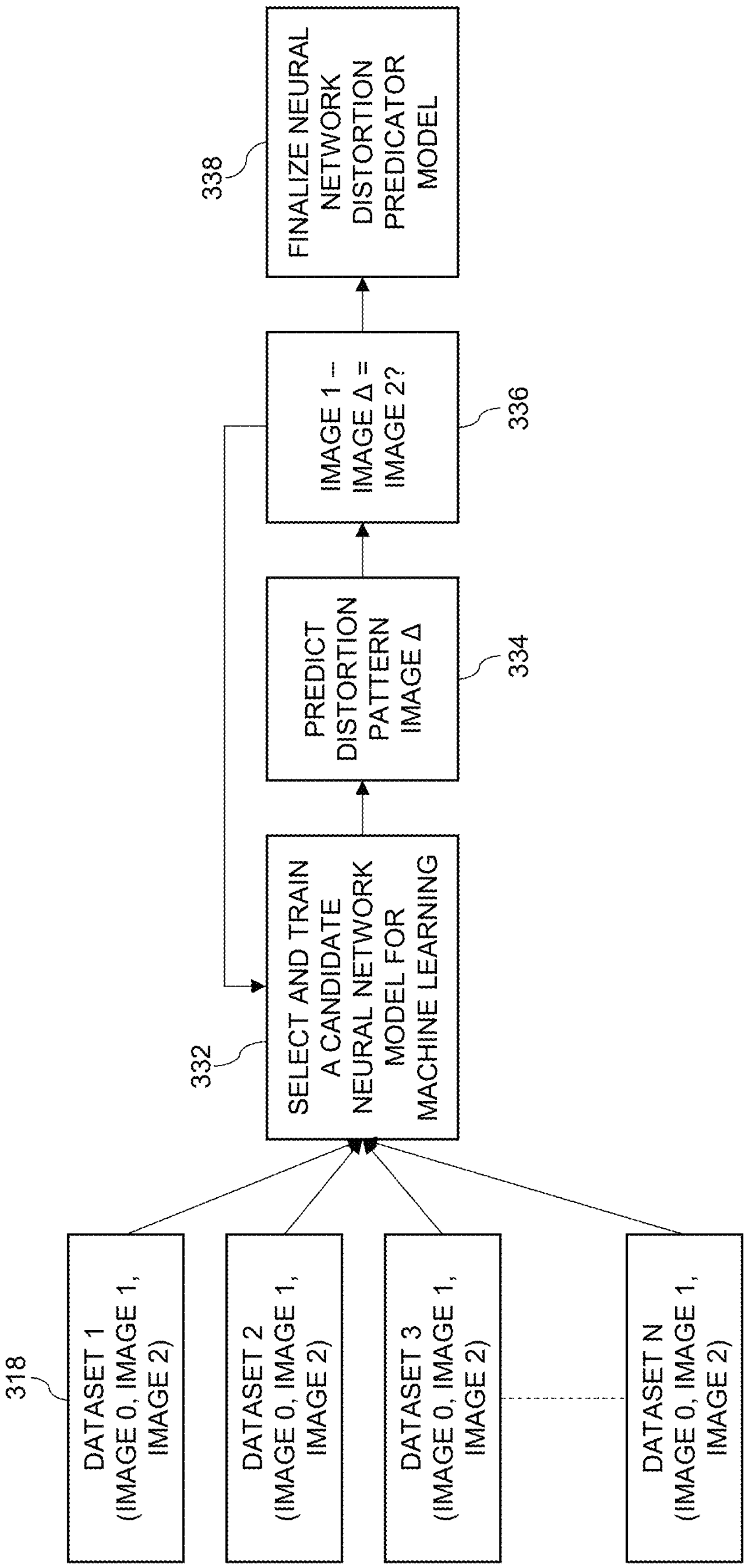
FIG. 9 is a diagram illustrating training of a neural network model with the training data set.

Referring now to FIG. 9, some additional detail for training a neural network model for interference prediction is illustrated. The training was discussed briefly in conjunction with steps 214, 216, and 218 of FIG. 5. FIG. 8 provides a more explicit visualization of the use of datasets 318 as inputs into a neural network model. More particularly, in step 332 a neural network model is selected and trained with datasets 318. Additional datasets 318 are used to test the model, with which the model predicts a distortion pattern from "image 0" in step 334, resulting in a delta image. Then in step 336, the delta image is subtracted from distorted "image 1," with the result being compared to clean "image 2." If the results are sufficiently close to the "image 2" corresponding to each, then the model is finalized and uploaded onto controller 136 (shown in FIG. 2) of each system 100 (shown in FIG. 2) being made. Otherwise, the steps beginning with step 332 are repeated. As previously discussed, the MobileNetV2 architecture has provided satisfactory results in development of an exemplary embodiment of system 100 (shown in FIGS. 1-3).

Figure 10:
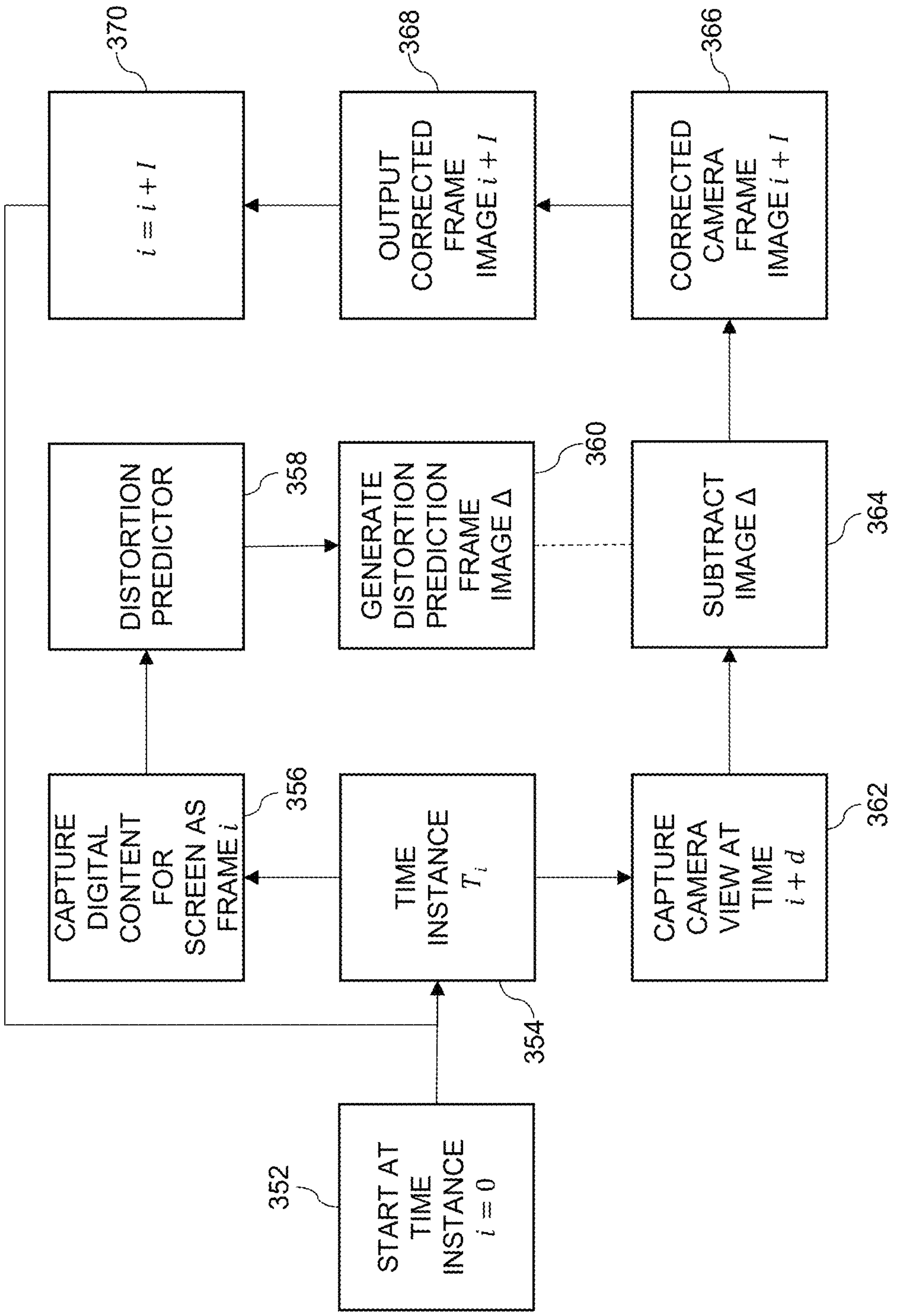
FIG. 10 is a diagram of running the inference model as a distortion predictor and executing a distortion pattern remover.

Operation of system 100 (shown in FIG. 1) was illustrated and described in general terms in FIG. 6. Referring now to FIG. 10, the functionality is illustrated in a way to facilitate visualization of the interaction of the components performing the steps. More particularly, the process starts at an initial time instance 352 and is repeated for each time instance 354 based on the frame rate of video used. For example, each time instance 354 is one-thirtieth of a second before the subsequent time instance 354 when a frame rate of thirty frames per second is used.

At time each time instance 354, digital content intended for display as frame i, corresponding to the time instance 354, is captured in step 356. Then in step 358 inference computation of the distortion predictor—the trained model—is run, and generates a distortion prediction frame image, or a delta image, in step 360. The subsequent camera frame at time instance i+d, where d is the time interval between frames, is captured in step 362, providing camera frame i+1.

In step 364, the delta image for display frame i is subtracted from camera frame i+1, which results in step 366 of achieving a distortion corrected version of camera frame i+1. The corrected version of camera frame i+1 is sent to video output, e.g., to a video conference system, in step 368. Finally, in step 370 the process is repeated for the next time instance.

While there have been shown what are presently considered to be preferred embodiments of the present invention, it will be apparent to those skilled in the art that various changes and modifications can be made herein without departing from the scope and spirit of the invention.

What is claimed is:

1. A method for video display and capture, comprising the steps of:

providing a display apparatus comprising a partially transparent display, a camera located behind the partially transparent display and configured to capture images through the partially transparent display, and a controller;

preparing an interference prediction model;

loading the interference model onto the controller of the display apparatus;

obtaining an input video frame;

obtaining a camera frame;

sending the input video frame to the interference prediction model;

receiving a predicted delta image from the interference prediction model; and subtracting the predicted delta image from the camera frame to create a clean image, wherein the step of preparing an inference prediction model comprises the steps of:

preparing a plurality of datasets, each dataset comprising a display image, a camera image with interference, and a clean camera image;

for each dataset, performing the steps of:

predicting, using a neural network model, a distortion pattern image delta, subtracting the predicted distortion pattern image delta from the camera image with interference to create a cleaned image, and comparing the cleaned image with the clean camera image; and finalizing the neural network model for use as the interference prediction model.

2. The method for video display and capture of claim 1, further comprising the step of combining the clean image with additional digital content.

3. The method for display and video capture of claim 1, further comprising the step of sending the clean image to one or more remote recipients.

4. The method for display and video capture of claim 2, further comprising the step of sending the combined clean image and additional digital content to one or more remote recipients.

5. The method for display and video capture of claim 1, wherein a Wasserstein distance metric is used in the step of comparing the cleaned image with the clean camera image.

6. The method for display and video capture of claim 1, wherein the step of preparing an interference prediction model further comprises the step of uploading the model to the controller.

7. The method for display and video capture of claim 1, wherein the step of preparing a plurality of datasets comprises, for each dataset, the steps of:

generating a single frame static image for use as the display image;

capturing a first image from behind the partially transparent display while the single frame static image is displayed for use as the camera image with interference; and capturing a second image from behind the partially transparent display while no image is displayed for use as the clean image.

8. The method for display and video capture of claim 1, wherein the partially transparent display comprises a film configured to display an image from a projector.

9. The method for display and video capture of claim 8, wherein the partially transparent display is at least fifteen percent transparent.

10. The method for display and video capture of claim 1, wherein the partially transparent display comprises a transparent organic light-emitting diode display.

11. The method for display and video capture of claim 1, wherein the controller comprises a system-on-a-chip with an artificial intelligence coprocessor configured to execute the interference prediction model to obtain the predicted delta image.

* * * * *